March 6, 1934.    A. KINDELMANN    1,949,477
ADJUSTABLE SHUTTER
Filed Dec. 11, 1930    3 Sheets-Sheet 1
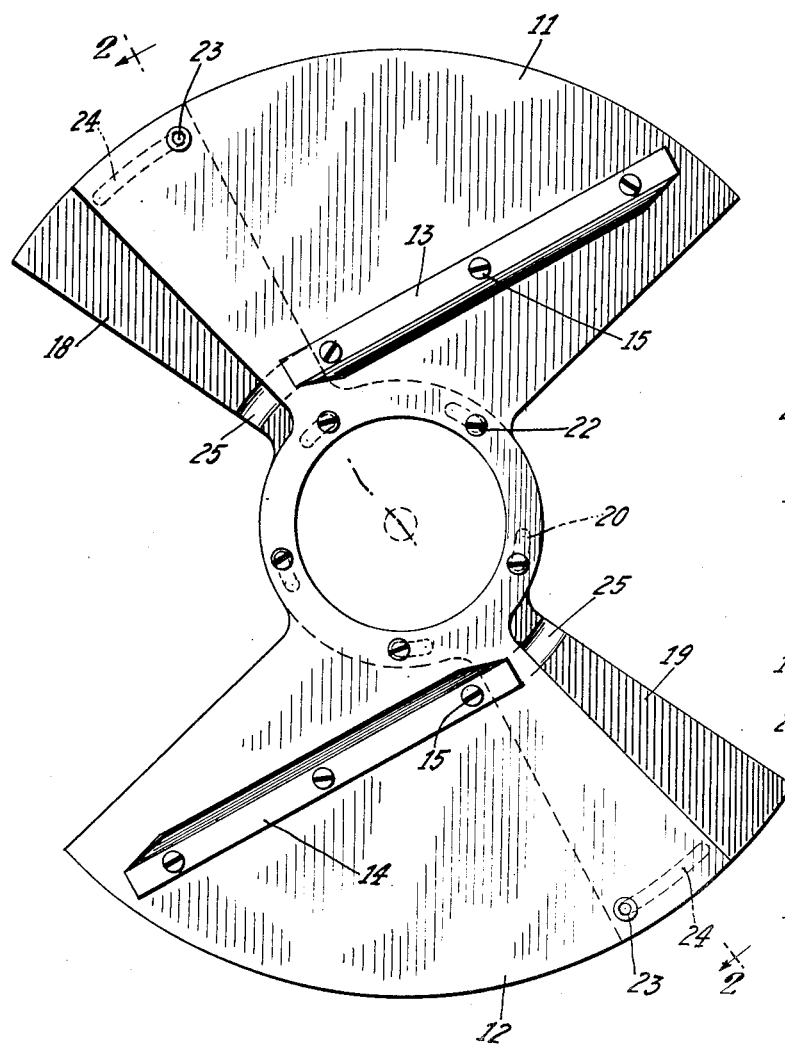
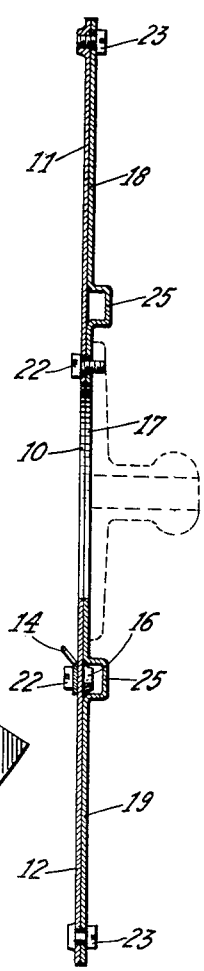
INVENTOR
Albert Kindelmann
BY his ATTORNEYS

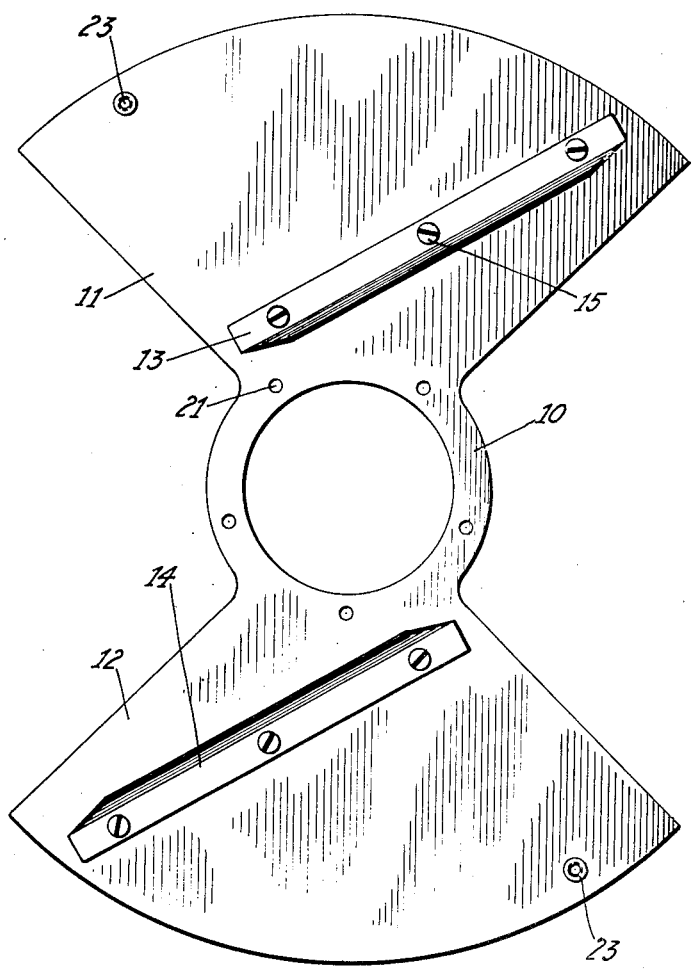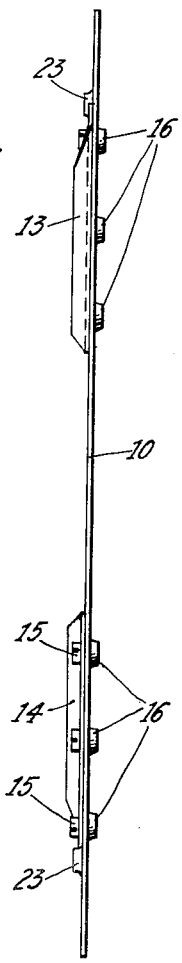

March 6, 1934.   A. KINDELMANN   1,949,477
ADJUSTABLE SHUTTER
Filed Dec. 11, 1930   3 Sheets-Sheet 3
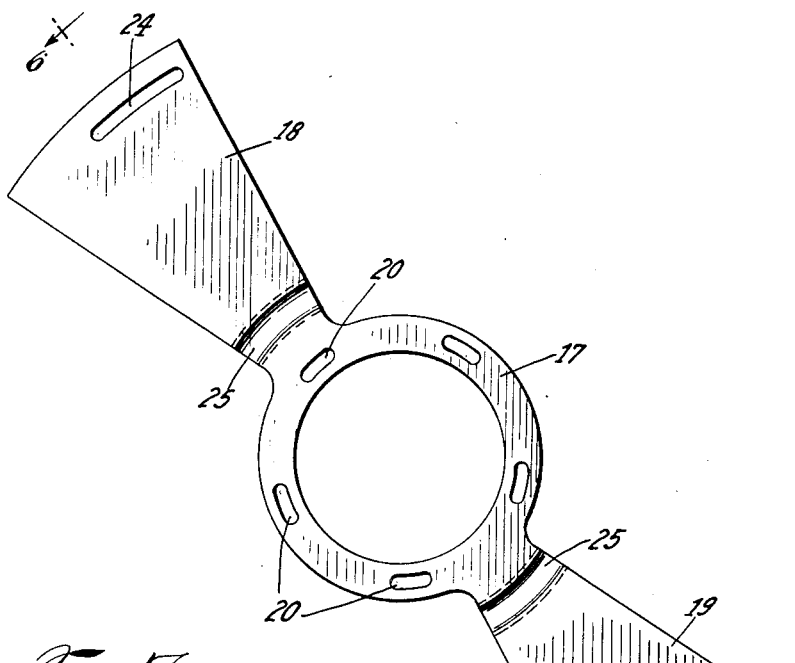
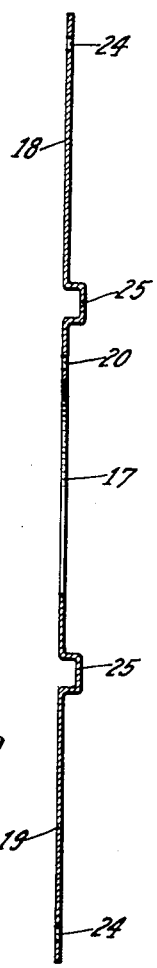
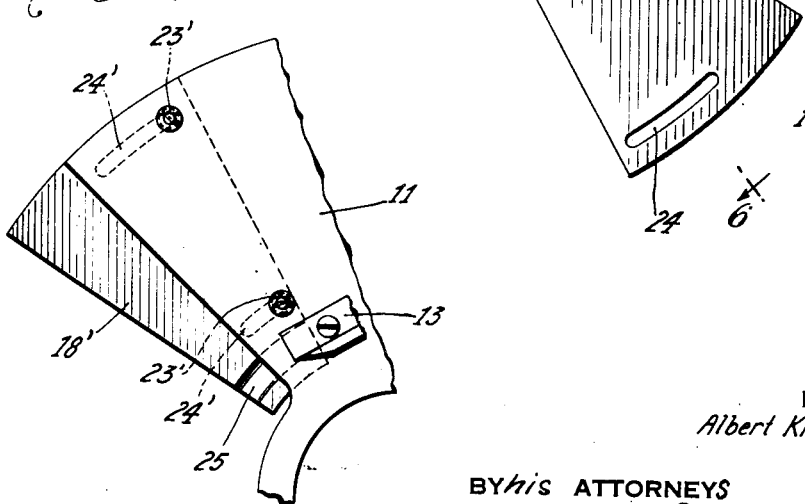
INVENTOR
Albert Kindelmann.
BY his ATTORNEYS Patented Mar. 6, 1934

1,949,477

UNITED STATES PATENT OFFICE 1,949,477

ADJUSTABLE SHUTTER

Albert Kindelmann, Floral Park, N. Y., assignor to International Projector Corporation, New York, N. Y., a corporation of Delaware Application December 11, 1930, Serial No. 501,488

4 Claims. (Cl. 88—19.3)

This invention relates to improvements in shutters for motion picture machines and has special reference to a new and improved shutter, a portion of which is adjustable to vary the blade widths.

The main object of the invention is to provide a simple, and efficient shutter, a portion of which is adjustable so that the angular dimension of the light opening in the shutter may be quickly, easily, and accurately varied to change the amount of light allowed to pass by the shutter.

A further object is to provide a shutter of the type mentioned, in which the structure is simple, economically manufactured, and in which the adjustment can be made by the operator without materially interfering with the operation of the machine, and permits him to firmly fasten the parts after adjustment.

A further object is to provide a construction in which a ventilating shutter is provided with means for adjusting the width of its blades, and in which the adjustable portion can be manipulated even though the path of its movement would otherwise be obstructed by such projections as ventilating ribs or elements.

Further and more specific objects, features and advantages will more clearly appear from a consideration of the specification hereinafter taken in connection with the accompanying drawings which form part of the specification and will illustrate a present preferred form of the invention.

Briefly considered in general terms the invention includes in the form shown in the drawings which is a preferred form, a two-bladed shutter, each blade of which has an angular width of reasonable variations such as from 75° to 100°, depending upon the use to which the shutter is designed. In order to be able to easily and quickly vary the amount of light opening, if it is desired to control the amount of projection light, an auxiliary adjustable blade is disposed adjacent to the surface of the main blade preferably in a plane parallel to the plane of the main blade and lying closely thereagainst. The invention also preferably concerns the provision of simple, adjustable means on a ventilating shutter whereby the width of its blades may be readily varied. The ventilating shutter may be one in which the blades as a whole are bent to produce a fan action or in which the ordinary flat blade is provided with fan-like ribs to produce the ventilating action.

Briefly, the auxiliary adjustable blade is connected to the main blade by any suitable adjusting means such as cooperating slots and pins, so that the auxiliary blade can be adjusted, and then quickly set in the desired position. The auxiliary blade in angular dimension is generally much smaller than the main blade and is shown as approximately 30°.

In the form shown in the drawings the main blade is provided with ventilating ribs or projecting elements. These ribs control the position of the auxiliary blade in order that this auxiliary blade shall lie closely adjacent to the main blade. The offset portions are adapted to clear these rib projections.

The present preferred form of the invention is shown in the drawings, in which:

Fig. 1 is a front elevation of a complete device, showing the main shutter with the auxiliary shutter adjusted to cut off a portion of the normal light apertures of the main shutter.

Fig. 2 is a longitudinal section taken on line 2—2 of Fig. 1.

Fig. 3 is a front elevation of the main two-bladed shutter.

Fig. 4 is a side elevation thereof.

Fig. 5 is a front elevation of the auxiliary two-bladed shutter.

Fig. 6 is a longitudinal section of the auxiliary shutter taken on line 6—6 of Fig. 5.

Fig. 7 is an elevation of part of a modified construction, in which the adjustable auxiliary portion of each blade is adjustable independently of the corresponding portion on the other blade or blades.

As shown in the drawings the preferred present form of the invention comprises a main shutter having a central portion 10 and oppositely disposed blades 11 and 12. These blades 11 and 12 in the preferred form are provided with angular disposed projecting wings such as 13 and 14 which are fastened to the main blades 11 and 12 by suitable screws 15, the rear ends of each projecting through the plates 11 and 12 and from the rear face thereto to a suitable extent as shown by numeral 16 in Fig. 2. These ventilating ribs or elements 13 and 14 have portions as shown in Fig. 2 which project from the face of the main blades at an angle so that as the shutter is operated, these projecting portions could as above mentioned be operated to create a current of air in a desired portion to cool the film and the projection head especially when the apparatus is running at slow speed and the danger of over-heating the film becomes greatest.

It has been found greatly desirable at times to be able to readily change the amount of light opening between the shutter, and to that end there is provided an auxiliary blade such as in Figs. 3 and 4 which has a central portion 10 of the main blade and oppositely disposed blade portions of approximately 30° angular dimension. The central portion 17 of this auxiliary blade is provided with elongated slots 20 therearound. These slots are adapted to register with holes 21 in the corresponding portion 10 of the main blade. In the assembled device, adjusting bolts such as 22 will pass through these aligned holes and slots so that the auxiliary blade may be adjusted to extend beyond the corresponding edges of the main blades the desired amount. The bolts can then be tightened up by means of the nuts 16 on their rear end. The outer portions of the main blades near corresponding edges thereof are provided with headed screws such as 23, the shanks of which pass through elongated slots 24 described in corresponding portion of the auxiliary blade. The heads of these screws lie against the outer face of the auxiliary blade and hold the outer edges of these blades in proper relation against the adjacent surface of the main blades.

In order that the rearwardly projecting nuts 16 above-mentioned may not interfere with the proper adjustment of the auxiliary shutter this latter shutter on each of the blades 18 and 19 is provided with an off-set portion 25 of sufficient depth and width to clear the nut 16, during the adjustment or movement of the auxiliary shutter. For the purpose of present form of the invention because of the width of the auxiliary blade and its relatively narrow field of movement it is only necessary to off-set it to avoid the one nut, if a greater area of movement is desired further off-set portions to avoid further obstructions, could be provided. In Fig. 5 the auxiliary shutter is shown in an adjusted position with a portion of its area projecting beyond corresponding edges of the main shutter blades to reduce the light opening of the hole by a small amount. The amount to which the light opening is reduced could easily be varied by loosening the bolts 22, adjusting the shutter and then tightening the bolts.

The form of the invention shown in the drawings, with reference to Fig. 7 is a modification in which the blades 11 and 12 have associated therewith the adjustable portions 18' and 19'. In this modification, however, this adjustable portion and the respective main blades are independent of each other and not connected, as shown in the previous figures. Because of this independency, the main blade portions are provided with headed screws or projections 23' at two spaced points adjacent the one edge of the blade and the other ones of these cooperating, as before, with the elongated slots 24'. This construction will permit the independent variations of the width of any blade without varying the width of the other blades of the shutter, if such an independent variation is desired.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In combination, a shutter having a pair of oppositely disposed blades having a connecting central portion, projecting elements spaced on said central portions, the outer portion of said blades adjacent corresponding edges having projecting members thereon, an auxiliary shutter having oppositely disposed blades and a central connecting portion, the blades being of a lesser angular dimension than the main blades, a central connecting portion of the auxiliary blade having elongated slots therein adapted to receive the projecting elements on the corresponding portion of the main shutter, the outer ends of the blades of the auxiliary shutter adjacent corresponding edges thereof being provided with elongated slots disposed substantially parallel to the outer edge of the blades, these elongated slots adapted to receive the projecting elements or members on the corresponding portions of the main blade.

2. In combination, a rotatable shutter having a pair of oppositely disposed blades of substantially 90° angular dimension and a central connecting portion between said blades, said central portion having projecting pins thereon spaced apart, a projecting ventilating rib disposed on one surface of each of said blades, means for fastening said ribs to said blades, said fastening means projecting therein to the other side of said blades, an auxiliary adjustable shutter having a pair of oppositely disposed blades of lesser angular dimension and adapted to be moved in a plane substantially parallel to the plane of movement of the main blade and disposed flat against one surface of said main blade, a central connecting portion between the blades of said auxiliary shutter and provided with elongated slots to receive the projecting pins on the corresponding portion of the main blade, said pins adapted to be tightened to hold the auxiliary shutter in any adjusted position, an offset portion on the auxiliary shutter blades adapted to clear the one or more of the fastening means on the main blade to permit movement of the auxiliary blades, the outer portion of the auxiliary blades having elongated holes therein, and projecting elements on the corresponding portions of the main blades received in said elongated slots to hold the outer portion of the blades in proper relation at all times.

3. In combination, a shutter having a pair of oppositely disposed blades having a connecting central portion, projecting elements spaced on said central portions, the outer portion of said blades adjacent corresponding edges having projecting members thereon, an auxiliary shutter having oppositely disposed blades and a central connecting portion, the central connecting portion of the auxiliary blade having elongated slots therein adapted to receive the projecting elements on the corresponding portion of the main blade, the outer ends of the blades of the auxiliary shutter adjacent corresponding edges thereof being provided with elongated slots disposed substantially parallel to the outer edge of the blades, these elongated slots adapted to receive the projecting elements or members on the corresponding portions of the main blade.

4. In combination, a rotatable shutter having a pair of oppositely disposed blades of substantially 90° angular dimension and a central connecting portion between said blades, said central portion having projecting pins thereon spaced apart, a projecting ventilating rib disposed on one surface of each of said blades, means for fastening said ribs to said blades, said fastening means projecting thereon to the other side of said blades, an auxiliary adjustable shutter having a pair of oppositely disposed blades adapted to be moved in a plane substantially parallel to the plane of movement of the main blade and disposed flat against one surface of said main blade, a central connecting portion between the blades of said auxiliary shutter and provided with elongated slots to receive the projecting pins on the corresponding portion of the main blade, said pins adapted to be tightened to hold the auxiliary shutter in any adjusted position, an offset portion on the auxiliary shutter blades adapted to clear the one or more of the fastening means on the main blade to permit movement of the auxiliary blades, the outer portion of the auxiliary blades having elongated holes therein, and projecting elements on the corresponding portions of the main blades received in said elongated slots to hold the outer portion of the blades in proper relation at all times.

ALBERT KINDELMANN.